Figure 1:
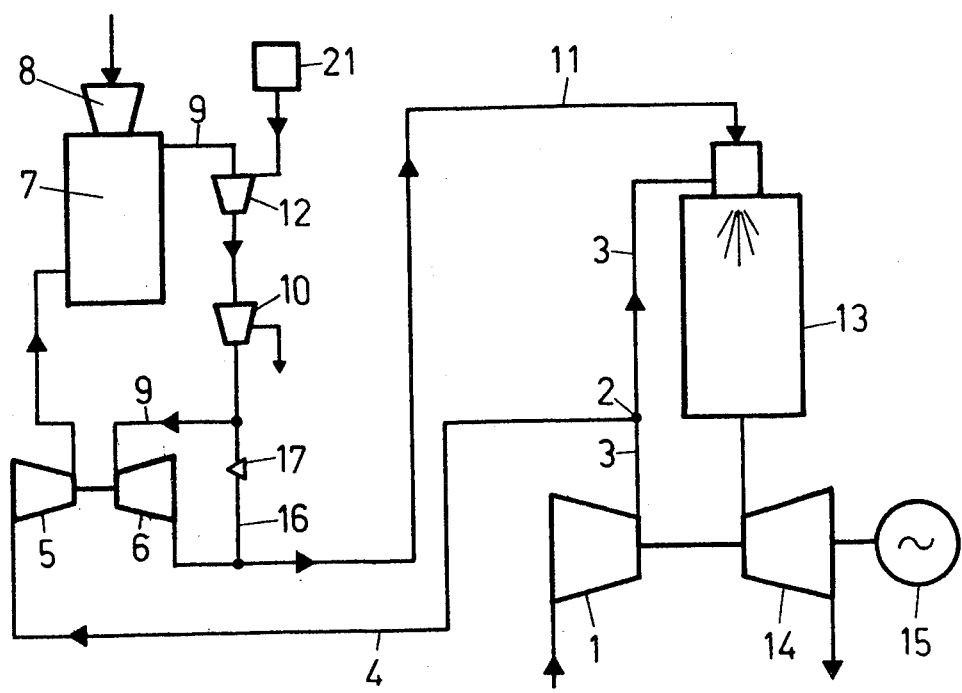

United States Patent [19]

Pfenninger

[11] 4,095,419
[45] Jun. 20, 1978

[54] THERMAL POWER PLANT

[75] Inventor: Hans Pfenninger, Baden, Switzerland

[73] Assignee: BBC Brown Boveri & Company Limited, Baden, Switzerland

[21] Appl. No.: 666,327

[22] Filed: Mar. 12, 1976

[30] Foreign Application Priority Data

Apr. 8, 1975   Switzerland .................... 4426/75

[51] Int. Cl.² ............................................. F02B 43/08
[52] U.S. Cl. ................................. 60/39.12; 415/121 G
[58] Field of Search ........................ 60/39.12, 39.02; 122/4 D; 110/28 J; 201/17; 55/73; 415/121 G

[56] References Cited

U.S. PATENT DOCUMENTS

| | | | |
|---|---|---|---|
| 3,002,347 | 10/1961 | Sprague | 60/39.18 B |
| 3,485,014 | 12/1969 | Atsukawa et al. | 55/73 |
| 3,704,587 | 12/1972 | Krieb | 60/39.12 |
| 3,866,411 | 12/1975 | Marion et al. | 60/39.02 |
| 3,933,978 | 1/1976 | Margraf | 55/73 |

FOREIGN PATENT DOCUMENTS

640,104   7/1950   United Kingdom ............ 415/121 G

OTHER PUBLICATIONS

*United Aircraft: Plans on 135-Mw Combined Cycle Tests,* Gas Turbine World, May, 1973, pp. 16-17.

*Primary Examiner*—Carlton R. Croyle
*Assistant Examiner*—L. J. Casaregola
*Attorney, Agent, or Firm*—Burns, Doane, Swecker & Mathis

[57] ABSTRACT

A thermal power plant comprises a thermal prime mover and a supercharged gas generator for generating producer gas from coal which, following separation of fly ash and sulphur, serves as fuel for the power plant. A charging group for the gas generator consists of coupled air compressor and gas turbine units, the compressor unit providing compressed air for operating the supercharged gas generator and the gas turbine unit being driven by unburned producer gas from the output of the supercharged gas generator, and a dry dust collector for the fly ash is incorporated in the flow path of the producer gas either ahead of the charging gas turbine or just after the first row of its moving blading. In order to also remove the sulphur content from the producer gas, an injector for a reagent which chemically binds the sulphur is provided in the flow path of the producer gas between the supercharged gas generator and the dry dust collector whereby the chemically bound sulphur is then removed from the producer gas together with the fly ash in the dry dust collector.

4 Claims, 4 Drawing Figures

THERMAL POWER PLANT

This invention relates to an improvement in a thermal power plant consisting essentially of a thermal prime mover, a compressed-gas generator for generating producer gas from coal which, following the separation of fly ash and sulphur, serves as fuel for the power plant, further of a charging group, the compressor of which compresses the air necessary for the supercharged gas generator and the gas turbine of which is driven with the unburned producer gas from the supercharged gas generator, and also of a dry dust collector for the fly ash, this collector being incorporated in the flow path of the producer gas before the gas turbine of the charging group, or integrated in this gas turbine.

A wet scrubber is mostly used for removing the flue dust and coke particles, together termed fly ash in the following, and sulphur from the producer gas. Owing to the associated cooling effect, approx. 10% of the chemically bound heat in the fuel is lost. To avoid this loss of sensible heat it has already been proposed (Swiss patent application 18016/73, German patent application No. P 24 03 928.9) that the fly ash should be collected ahead of the gas turbine of the charging group, while the sulphur is not removed until after the gas turbine. A corresponding application was filed in the United States on Dec. 9, 1974 under Ser. No. 531,110 (abandoned). This is because the temperature ahead of the gas turbine is too high, and only after expansion of the producer gas in this turbine is it lowered to a value which allows removal of the sulphur without loss of high-grade heat. This concept results in improved thermal efficiency of the whole installation, but the separate collection of fly ash and sulpur incurs certain disadvantages.

The principal object of the invention is to collect the fly ash and sulphur together in a thermal power plant incorporating a supercharged gas generator, without lowering the overall plant efficiency as is the case with a wet scrubber.

This object is achieved by means of an injection device, located in the flow path of the producer gas between the supercharged gas generator and the dry dust collector, for a reagent which chemically binds the sulphur contained in the producer gas and the sulphur is removed from the producer gas together with the fly ash in the dry collector.

An advantageous extension of the invention consists in the fact that, in order to lower the temperature of the producer gas to a temperature favourable for the reaction between the sulphur and the reagent, the supercharged gas generator incorporates a heat exchanger through which a coolant flows.

Here it is of benefit if the quantity of coolant flowing through the heat exchanger can be regulated in relation to the temperature of the producer gas ahead of the injection device.

The sulphur occurs of course in the form of hydrogen sulphide ($H_2S$). This can be bound, for example, to metal oxides or to calcium compounds. In the case of the invention this is done by mixing one of the named binding agents, in the form of powder for example, with the producer gas at the outlet from the gas generator, and after reaction with the sulphur the agent is removed again together with the fly ash ahead of, or in, the gas turbine of the charging group, as described in the patent application referred to above. With this procedure, both the fly ash and the sulphur can be removed by simple, inexpensive means.

Should it be that the temperature of the producer gas leaving the supercharged gas generator is too high, there are the following two possibilities, which can be applied jointly or each individually. A heat exchanger is located close to the point at which the producer gas emerges from the gas generator. One possibility is then to use the producer gas in the heat exchanger to superheat the water evaporated in the water jacket of the gas generator before making this with the gasification air. Similarly, in addition to generating steam in the water jacket, water can also be evaporated in the heat exchanger in order to be able to add a larger quantity of steam to the gasification air, in which case the temperature of the producer gas is already slightly lowered before the heat exchanger. This then gives a double effect since of course an exothermal process takes place in the lower part of the gas generator, because the coal is burned or gasified to carbon dioxide and carbon monoxide, while in the upper part of the gas generator, owing to the dissociation of water vapour, an endothermal process occurs which again lowers the temperature of the producer gas.

Despite the lower temperature of the producer gas ahead of the gas turbine of the charging group, the overall efficiency of the plant is not impaired because the heat extracted from the producer gas is either fed back to the supercharged gas generator with the steam, or it is recovered on the subsequent combustion of the producer gas.

With the two possibilities described it is possible, by regulating the flow rate of coolant through the heat exchanger, to keep the temperature of the producer gas constant at a value favourable to the reaction of the sulphur with the reagent.

Figure 2:
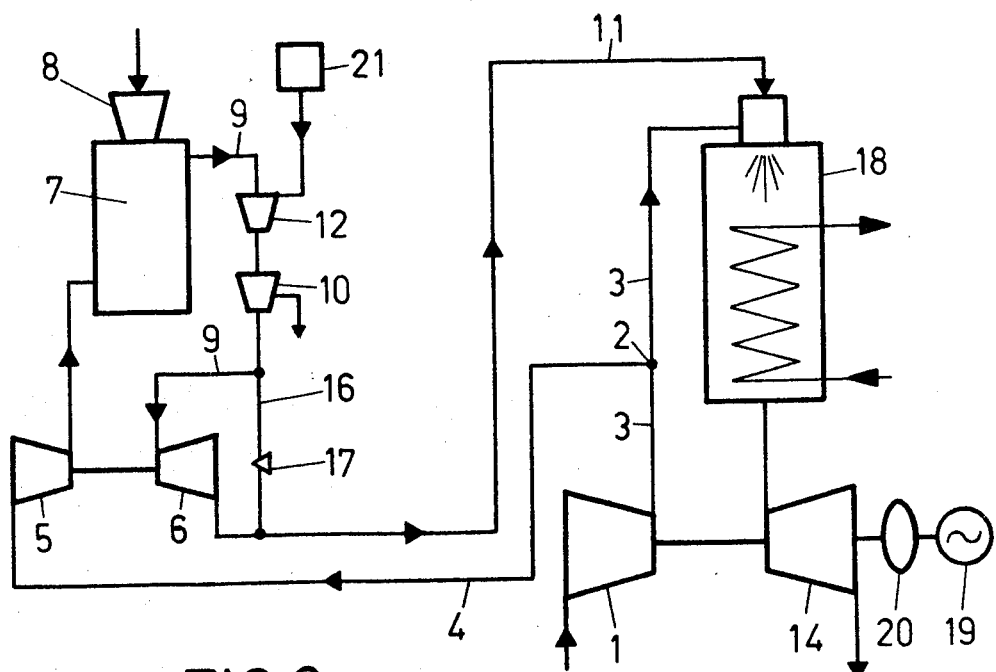
Figure 3:
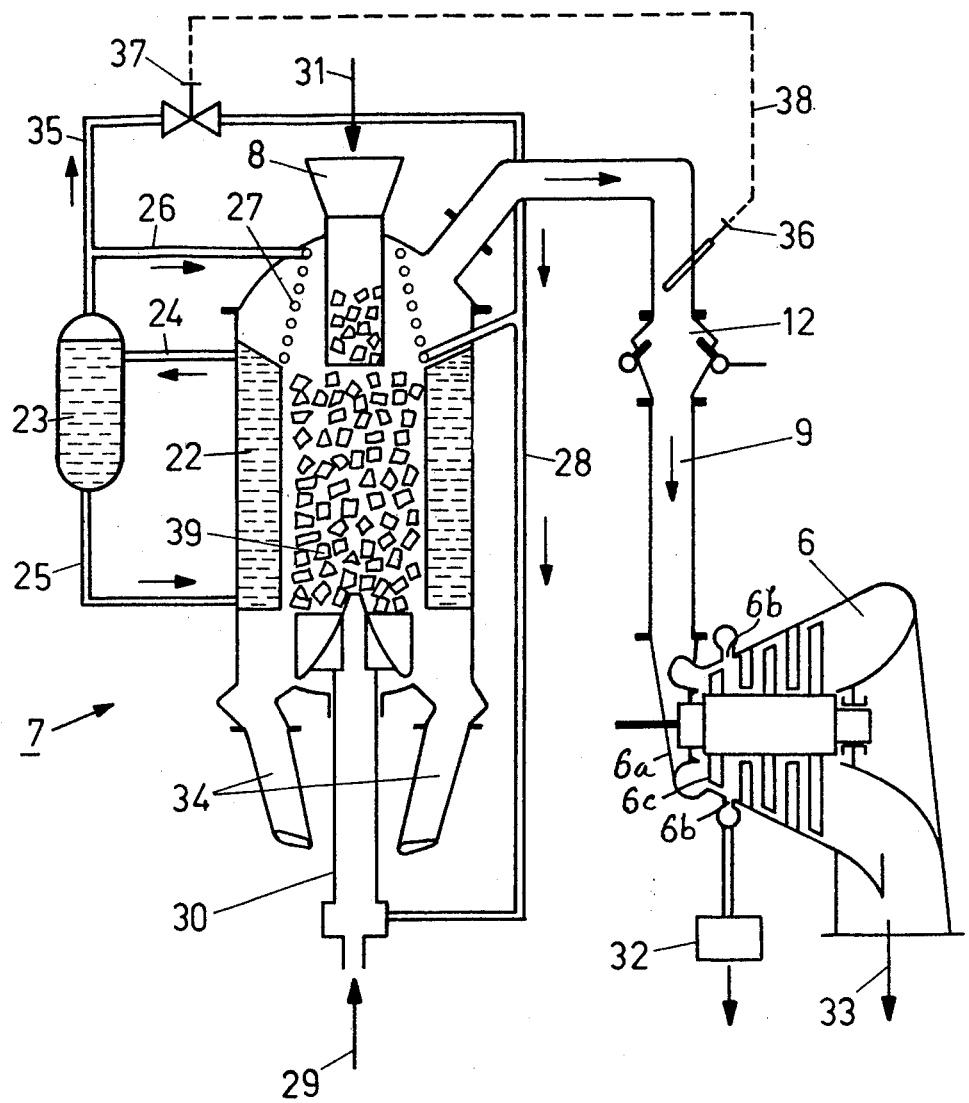
Figure 4:
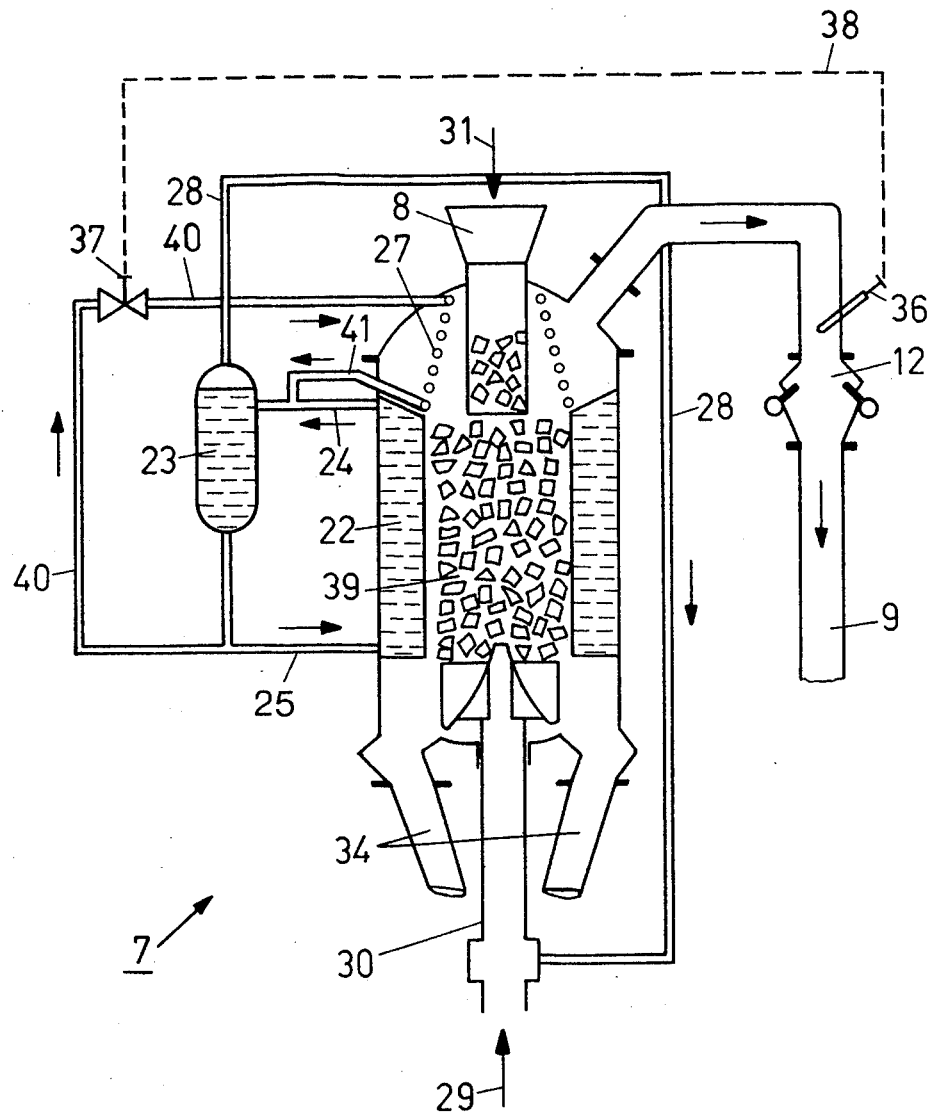

Examples of the invention are explained in more detail below and are illustrated in the accompanying drawings wherein:

FIG. 1 is a schematic diagram of a power plant with a supercharged gas generator for supplying a gas turbine, FIG. 2 is a schematic diagram of a part of a steam power plant with a supercharged gas generator for supplying a pressure-fired steam generator, FIG. 3 is a longitudinal section through a supercharged gas generator with the associated supply of cooling water, and FIG. 4 is an alternative form of FIG. 3.

In all the figures the same parts are identified by the same reference symbols.

As shown in FIG. 1, the air for pressurized gasification of the coal and the combustion air for the subsequent combustion of the producer gas are compressed jointly by compressor 1 to 10 bar, for example. At point 2 of air line 3 a small quantity of air is bled off and passed by way of pipe 4 to the charging group of the supercharged gas generator 7 consisting of compressor 5 and gas turbine 6. In compressor 5 this quantity of air is further compressed and fed to the supercharged gas generator 7, where it is used to gasify the coal introduced through trap 8. The producer gas passing from the supercharged gas generator 7 into the pipeline 9 has a temperature of 500°–600° C and a pressure of about twenty bar, and is fed to the gas turbine 6.

The pipeline 9 contains the injection device 12 which is supplied with a reagent from container 21, the reagent serving to bind the sulphur in the producer gas. The reaction takes place along the flow path to a centrifugal dust collector 10 located in pipeline 9, e.g., a van Tongeren collector, in which the fly ash and also the sulphur bound to the reagent are removed before the gas enters turbine 6 which may include additional separator means integral therewith as shown in FIG. 3.

After the gas turbine 6, the producer gas is passed along pipeline 11 into the combustion chamber 13 of the gas turbine 14, as also is the combustion air from compressor 1 via air line 3, the gas turbine 14 driving the compressor 1 and a useful energy producing device, e.g., an electric generator 15.

Since the producer gas after the centrifugal collector 10 still has a relatively high temperature, the gas turbine 6 would be able not only to drive the compressor 5 of the charging group, but also to supply energy elsewhere. However, it is also possible to dispense with the surplus energy and permit a large pressure drop in the supercharged gas generator 7.

A further possibility is also illustrated in the drawing. A bypass 16 around the gas turbine 6 is located between the pipelines 9 and 11 and controlled with valve 17. By sending a controllable quantity of producer gas along this bypass 16 it is possible to regulate the speed of the charging group and so match the air flow rate for the supercharged gas generator to the load at any given time.

FIG. 2 shows a part of a steam power plant which, insofar as it is illustrated, is largely identical to the plant in FIG. 1. Instead of a combustion chamber a pressure-fired steam generator 18 is provided here in which the producer gas is burned and the steam for the prime mover (not shown) is generated with the combustion gases. The compressor 1, which here again provides the air for pressure gasification of coal and the combustion air, forms, together with gas turbine 14, the charging group for the steam generator, to which the starter motor 19 and coupling 20 also belong.

In both of the power plants described the producer gas is separated from the fly ash and reagent, without previous cooling, by means of a centrifugal collector. The separation process is thus of a dry type which is very effective and simple, and operates virtually without heat loss.

The raw producer gas contains up to 6 gr. of fly ash per kg of gas (= 6000 ppm). Even a fraction of this quantity of ash would be sufficient to destroy the gas turbine of the charging group of the supercharged gas generator within a short time.

The collector for the fly ash and the reagent can be either separate from the gas turbine 6, as indicated in FIGS. 1 and 2, or integrated in the gas turbine, as described in the patent applications referred to above. In order to obtain a particularly pure, i.e., dust-free producer gas, it is thus self-evident and advantageous to utilize both of these arrangements for dust collection in the same power plant.

FIG. 3 shows the supercharged gas generator 7 together with the details necessary to an understanding of the invention, and also the gas turbine 6 of the charging group which drives the compressor (not shown here). The coal introduced into the trap 8 at 31 and through this into the gas generator, is gasified in chamber 39; the air flows through pipe 30 into the chamber, as indicated by the arrow 29. The producer gas thus formed gives up a part of its heat in the heat exchanger 27 before leaving the supercharged gas generator 7 via pipe 9, which leads to the gas turbine 6. The liquid slag is removed through tubes 34.

The pipe 9 incorporates the injection device 12 with which a reagent powder is fed into the producer gas. This can be done with the aid of an inert gas, for example. With efficient mixing a relatively short flow path is sufficient to bind the sulphur contained in the producer gas chemically to the reagent. In the gas turbine 6 the fly ash and reagent powder are separated after the first moving blade row on the rotor by centrifugal action and collected in container 32 or in a filter for further treatment. As illustrated in FIG. 3, pipe 9 is connected to the intake side of turbine 6 by means of a spiral entry 6a, in which practically all of the fly ash and reagent powder with the sulphur bound to it are separated from the gas by centrifuging, and these are removed from the turbine by means of slots 6b in the turbine casing located after the first row 6c of rotor blading which provides a further centrifuging effect on, and removal of, any remaining particles in the gas. The cleaned, sulphur-free producer gas leaves the gas turbine 6 in the direction of arrow 33 to be utilized further as shown in FIGS. 1 or 2.

The chamber 39 is cooled by means of a water jacket 22. This is connected to the feedwater tank 23, which at the same time serves as a steam/water separator. Wet steam flows from the water jacket 22 through pipeline 24 to the tank 23, and water passes from tank 23 through pipeline 25 to the water jacket 22. The separated steam is taken via pipeline 26 to the heat exchanger 27 where it is superheated by the hot producer gas, whereupon it is fed through pipeline 28 to pipe 30 to be mixed with the air for the gas generator.

Bypass line 35 branches from pipeline 26 and leads around the heat exchanger 27 direct into pipeline 28. Fitted in pipeline 9 ahead of the injection device 12, when viewed in the flow direction of the producer gas, is a temperature sensor 36 from which a lead 38 passes to a throttle valve 37, which controls flow through the pipeline 35. The temperature sensor 36 and throttle valve 37 are coupled in such a manner that the valve 37 tends to close when the temperature of the producer gas rises, and to open when the temperature falls. The operating principle is self-evident: as the valve 37 closes, so less steam flows through the bypass line 35 and more steam through the heat exchanger 27, whereupon the temperature of the steam mixture in pipeline 28 rises, the producer gas is more sharply cooled, and the temperature measured by sensor 36 falls. The reverse procedure takes place as the valve 37 opens. With this form of regulation it is possible to maintain the temperature before the injection device 12 at a value favourable to the reaction between the sulphur and the reagent.

FIG. 4 shows the same supercharged gas generator 7 as FIG. 3, but with a different steam and water flow configuration. The steam separated in the feedwater tank 23 passes direct into pipeline 28, from which it flows to the air pipe 30. The pipeline 40 branches from pipeline 25 and leads to the heat exchanger 27, the outlet 41 from which terminates in pipeline 24. The circuit (through tank 23 - pipeline 25 - water jacket 22 - pipeline 24 - tank 23) is thus supplemented by the parallel circuit (tank 23 - pipeline 25 - pipeline 40 - heat exchanger 27 - outlet pipe 41 - pipeline 24 - tank 23). The throttle valve 37, which is influenced by the temperature sensor 36 via lead 38, is fitted in pipeline 40, and thus its interaction with the temperature sensor is also different from the arrangement of FIG. 3. As the temperature rises the valve tends to open, and to close when the temperature falls. With this configuration, the temperature before the injection device 12 is held constant, while only the flow rate of the steam passing to air pipe 30 for the gasification process varies, but not its temperature.

I claim:

1. In a thermal power plant comprising at least one thermal prime mover, a supercharged gas generator for generating hot pressurized producer gas from a sulphur-containing coal, said producer gas after separation of fly ash and sulphur being utilized as the fuel for the power plant and which further includes coupled air compressor and gas turbine units, said compressor unit serving to compress air and deliver it to said gas generator, and said gas turbine unit being driven by the hot pressurized and unburned producer gas from the outlet of said gas generator, the improvement which comprises means provided directly in the flow path of the hot pressurized producer gas at the outlet of said gas generator for injecting a reagent into the hot gas which chemically binds the sulphur, a first separator of the centrifugal type located in the path of the hot pressurized producer gas following said reagent injection means and ahead of said gas turbine for separating out fly ash and sulphur bound reagent and a second centrifugal separator structurally integrated with said gas turbine and which is comprised of a spiral entry section at the intake side of said turbine ahead of and a multiplicity of slots in the turbine casing after the first row of blading on the turbine rotor which provides a further centrifuging affect upon and removal of any remaining fly ash and sulphur bound reagent in the gas.

2. A thermal power plant as defined in claim 1 and which further includes a heat exchanger incorporated in said supercharged gas generator through which flows a liquid coolant for lowering the temperature of the producer gas to a level favourable to chemical reaction between the sulphur and the reagent, said liquid coolant being utilized in the gasifying process.

3. A thermal power plant as defined in claim 2 and wherein means are provided for regulating the flow of the coolant through said heat exchanger in relation to the temperature of the producer gas ahead of said reagent injector means.

4. A thermal power plant as defined in claim 2 wherein said liquid coolant is water and the steam produced in said heat exchanger is admixed with combustion air supplied to said gas generator.

* * * * *